United States Patent [19]
Tamate et al.

[11] 3,724,957
[45] Apr. 3, 1973

[54] CONCENTRATION MEASURING APPARATUS

[75] Inventors: Tokutaro Tamate; Hirokazu Habuchi; Tsutomu Hirayama, all of Tokyo, Japan

[73] Assignee: Yokogawa Electric Works Limited, Tokyo, Japan

[22] Filed: Mar. 4, 1971

[21] Appl. No.: 121,071

[52] U.S. Cl. ................356/116, 250/225, 356/104, 356/206, 356/208, 356/246
[51] Int. Cl. .............................................G01n 21/40
[58] Field of Search........356/72, 116, 114, 104, 246, 356/206, 208, 128; 250/225

[56] References Cited

UNITED STATES PATENTS

| 3,518,003 | 6/1970 | Meyn | 356/116 |
| 3,468,607 | 9/1969 | Sloane et al. | 356/116 |
| 2,963,938 | 12/1960 | Irland et al. | 356/212 |
| 3,027,461 | 3/1962 | Kavanagh | 356/104 |
| 3,310,680 | 3/1967 | Hasegawa | 356/104 |

FOREIGN PATENTS OR APPLICATIONS

| 386,537 | 12/1923 | Germany | 356/116 |
| 337,340 | 5/1959 | Switzerland | 356/116 |
| 1,095,210 | 12/1967 | Great Britain | 356/116 |

Primary Examiner—William L. Sikes
Assistant Examiner—J. Rothenberg
Attorney—Chittick, Pfund, Birch, Samuels & Gauthier

[57] ABSTRACT

There are provided a sample cell containing a solution containing an optically active substance between a polarizer and an analyzer of a Nicol system, a first photoelectric detector disposed to receive the light activated in accordance with the concentration of the optically active substance, a second photoelectric detector disposed to receive the light transmitted through the solution independently of the optical activity, and means for determining the ratio of the outputs of the first and second photoelectric detectors.

Where the concentration measuring apparatus is used to independently measure the concentrations of pulp and clay in a solution used in a paper making process, said means for determining the ratio of the outputs of the first and second photoelectric detectors determines the concentration of the pulp. In this case, there is further provided a transmission and scattering type concentration meter including a third photoelectric detector for receiving the light transmitted by the pulp and clay, a fourth photoelectric detector for receiving the light scattered by the pulp and clay, second means responsive to the outputs of the third and fourth photoelectric detectors to provide an output corresponding to the concentrations of the pulp and clay and means responsive to the outputs of the first and second means for determining the concentration of the clay.

7 Claims, 13 Drawing Figures

INVENTORS
TOKUTARO TAMATE
HIROKAZU HABUCHI
TSUTOMU HIRAYAMA

BY Chittick, Pfund, Birch, Samuels & Gauthier
ATTORNEY

INVENTORS
TOKUTARO TAMATE
HIROKAZU HABUCHI
TSUTOMU HIRAYAMA

CONCENTRATION MEASURING APPARATUS

BACKGROUND OF THE INVENTION

This invention relates to a novel concentration measuring apparatus wherein the concentrations of pulp or sugar in solutions are measured by utilizing the optical activity of pulp or sugar.

In most of the prior art concentration measuring apparatus of the type described above, a sample cell formed by a pair of parallel transparent glass plates which are disposed with a small gap therebetween is generally used, but with such a cell where a solution of pulp and the like passed through the cell contains solid contaminants or lumps of pulp, such solid contaminants or lumps will partially clog the space between the glass plates, that is the cell, thus disturbing the flow of the solution in the cell with the result that accurate measuring becomes impossible. Further, as the light transmitted through the cell is directly measured, the measurement is influenced by the scattered light component. In other words, the result of measurement is not exactly proportional to the concentration, thus degrading the linearity of the result.

SUMMARY OF THE INVENTION

It is therefore a principal object of this invention to provide a novel concentration measuring apparatus of excellent characteristic free from the above defects.

Another object of this invention is to provide a novel concentration measuring apparatus having an improved sample cell which is not affected by solid contaminants or lumps contained in the solution to be measured.

Still another object of this invention is to provide new and improved concentration measuring apparatus including means to eliminate scattered light components contained in the transmitted light.

A further object of this invention is to provide novel concentration measuring apparatus which can be readily calibrated without the necessity of using a standard liquid.

A still further object of this invention is to provide an improved concentration measuring apparatus capable of independently measuring the concentrations of pulp and clay contained in a stock inlet or whitewater in a paper making process.

According to this invention, there is provided concentration measuring apparatus comprising an orthogonal Nicol system including a polarizer and an analyzer, a sample cell disposed between the polarizer and the analyzer and adapted to contain a solution containing an optically active substance, a first photoelectric detector disposed to receive the light with its polarized plane rotated in accordance with the concentration of the optically active substance in the solution, a second photoelectric detector disposed to receive the light transmitted through the solution independently of the optical activity, and means for determining the ratio of the outputs of the first and second photoelectric detectors.

When the concentration measuring apparatus just described is used to independently measure the concentrations of pulp and clay contained in a solution used in a paper making process, the solution is passed through the sample cell. Then the means for determining the ratio of the outputs of the first and second photoelectric detectors determines the concentration of the pulp. In this case, according to this invention, there is further provided a transmission and scattering type concentration meter including a lens for transmitting parallel light through the solution in the sample cell, a third photoelectric detector disposed to receive the light transmitted by the pulp and clay, a fourth photoelectric detector disposed to receive the light scattered by the pulp and clay, second means responsive to the outputs of the third and fourth photoelectric detector to provide an output corresponding to the concentrations of the pulp and clay and means responsive to the outputs of the first and second means for determining the concentration of the clay.

It is advantageous to install a scattered light eliminator behind the sample cell comprising a plurality of parallel light shielding members.

DESCRIPTION OF THE PREFERRED EMBODIMENTS

Figure 1:
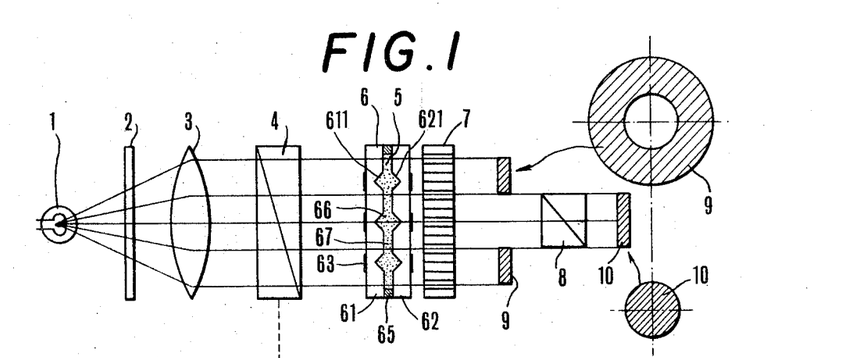
FIG. 1 diagrammatically illustrates an embodiment of the novel concentration measurement apparatus.
Figure 2:
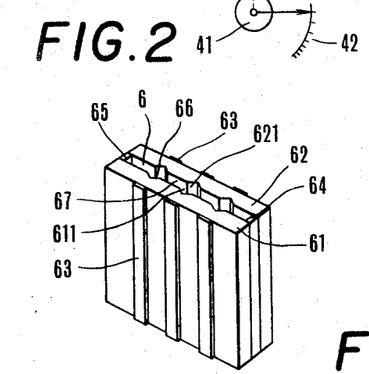
FIG. 2 shows a perspective view of one example of a sample cell utilized in the novel measuring apparatus.
Figure 3:
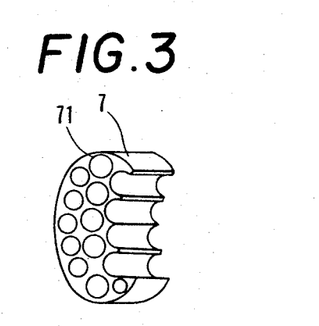
FIG. 3 shows one example of a scattered light eliminator partly broken away, utilized in this invention.

The embodiment of this invention shown in FIG. 1 comprises a source of light 1, a filter 2 which is used when necessary, a lens 3, and a polarizing element 4, such as a polarizing plate or a Nicol prism, which can be rotated about its axis by an operating knob 41, the angle of rotation being indicated by a scale 42. The liquid to be measured 5, for example, a solution containing an optically active substance such as pulp or sugar is contained in a cell 6. As shown in FIG. 2, cell 6 comprises a pair of transparent glass plates 61 and 62 provided with V-shaped grooves 611 and 621 on their inner surfaces in the direction of liquid flow, masks 63 on the outer surfaces of glass plates to prevent the light from transmitting through grooves 611 and 621 and spacers 64 and 65 which are interposed between glass plates to establish a definite spacing (effective width of the cell) which is determined by the concentration of the liquid to be measured. When measuring a solution of low concentration pulp (0 – 1.2 percent), the spacing is about 1 to 2 mm and it is necessary to decrease the width of the sample cell as the concentration of the liquid to be measured increases. The sample cell 6 includes channel sections 66 defined between parallel V-shaped grooves 611 and 621, and effective sections 67 defined between parallel flat surfaces of the glass plates 61 and 62. Behind the sample cell 6 is situated a scattered light eliminator 7 comprising a plurality of parallel cylindrical light shielding members 71 which permit light transmission only in the axial direction, as shown in FIG. 3. There are also provided an analyzer 8 comprising a Nicol system orthogonal to the polarizer, an annular photoelectric detector 9 such as a photocell and a circular disc shaped photoelectric detector 10. Lens 3 is adjusted to illuminate the entire surfaces of photoelectric detectors 9 and 10 by the light emanated by the source 1.

Figure 4:
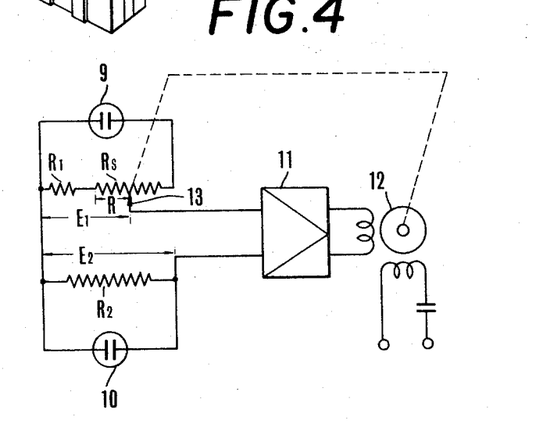
FIG. 4 shows a circuit diagram of the measuring apparatus.

Turning now to FIG. 4, there is shown a measuring circuit utilized in this invention. The photoelectric dector 9 is connected in parallel with a fixed resistor $R_1$ and a sliding resistor $R_s$ which are connected in series whereas the photoelectric detector 10 is connected in parallel with a resistor $R_2$. The sliding arm of the sliding resistor $R_s$ and one terminal of resistor $R_2$ are connected to the input terminals of an amplifier 11. The output of the amplifier is connected to a reversible servomotor 12 for driving the sliding arm of the sliding resistor $R_s$ as shown by dotted lines.

The novel concentration measuring apparatus operates as follows. The light emanated from the source 1 passes through filter 2 and lens 3 and is then converted into linear polarized light by the action of polarizer 4 and the polarized light is projected upon the sample cell 6. As above described, since the sample cell includes grooved sections 66 and effective sections 67, these two sections manifest different liquid resistances for the flow of the liquid continuously passed through the cell. More particularly, the flow resistance is lower at the grooved sections 66 than at the effective sections 67. For this reason, even when the liquid to be measured contains solid contaminants or lumps, such contaminants and lumps tend to flow through grooved sections 66 at which the flow resistance is lower which prevents clogging of the effective sections 67 by the contaminants and lumps thus assuring a stable flow condition. Even when solid contaminants or lumps clog the effective sections 67 they are quickly removed when they come to approach the grooved sections 66. It is to be understood that the configuration of grooves 611 and 621 is not limited to a V-shape but may be semicircular, U-shaped or of like configurations. Although grooves are formed on both glass plates, they may be formed on only one of the glass plates. Further, as the grooved sections 66 of the sample cell 6 are shielded by masks 63, the presence of such grooved sections does not affect the result of measurement.

The polarized plane of the light transmitted through the sample cell 6 is rotated polarized by the optically active substance such as pulp or sugar contained in the liquid to be measured. Eliminator 7 functions to eliminate the scattered light component from the light transmitted through the cell. A portion of the light independent of the optical activity is received by the annular photoelectric detector 9 and the remaining portion of the light which is related to the concentration of the optically active substance such as the pulp or sugar contained in the solution is received by the circular disc shaped photoelectric detector 10.

Output currents from photoelectric detectors 9 and 10 are linearly related to the received light quantity. The relationship between their output currents $I_1$ and $I_2$ and the concentration $C$ of the optically active substance such as pulp and sugar can be shown by the following equations of approximation.

$$I_1 = I_1(0) e^{-\epsilon_1 l c} \quad 1$$

$$I_2 = I_2(0) \sin^2(KC) e^{-\epsilon_2 l c} \quad 2$$

where $I_1(0)$: the output current produced by the transmitted light where $C = 0$, $I_2(0)$: the output current produced by the stray light where $$C = 0,$$

Figure 5A:
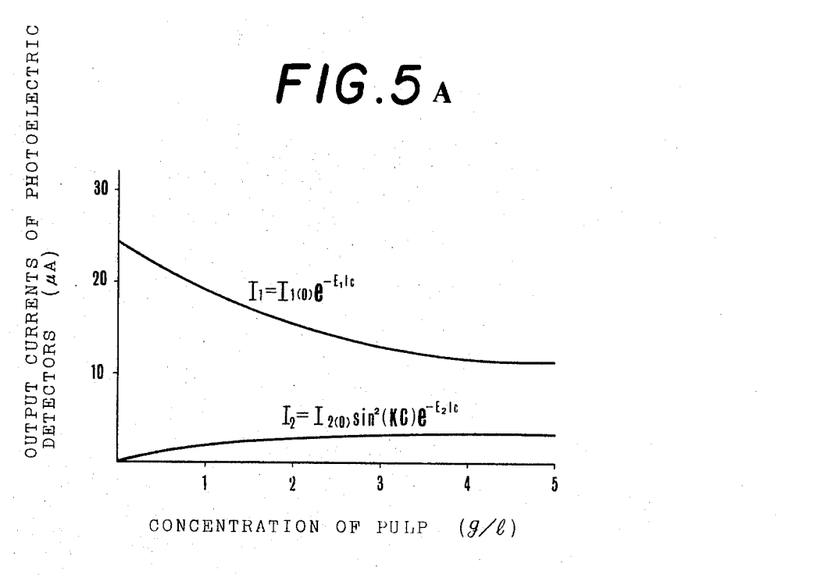
FIGS. 5 to 8 show characteristic curves helpful to explain the operation of the novel concentration measuring apparatus.
Figure 5B:
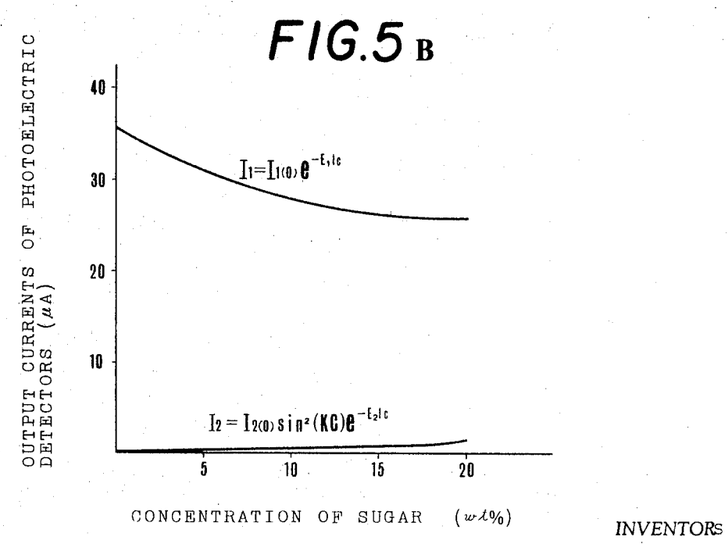

$e^{-\epsilon l c}$: the attenuation factor of the transmitted light due to turbidity or coloring of the liquid to be measured, $l$: the effective length of the sample cell and $K, \epsilon_1, \epsilon_2$: constants determined by the configuration of the sample cell, the characteristic of the photoelectric dectors and another factors. FIG. 5 shows the relationship between output current $I_1$ and $I_2$ and the concentration $C$, in which FIG. 5A shows the relationship between the concentration of pulp in grams/$l$. and the output current in microamperes and FIG. 5B that of sugar. Output currents $I_1$ and $I_2$ flow through resistors $R_1, R_s$ and $R_2$ and the difference between voltage drops $E_1$ and $E_2$ across these resistors is amplified by amplifier 11 and then applied to the reversible servomotor 12 to rotate it in the forward or reverse direction depending upon the polarity and magnitude of said difference voltage. Rotation of the servomotor 12 moves the sliding arm of the sliding resistor $R_s$ 13 and the bridge comprised by resistors $R_1, R_s$ and $R_2$ balances automatically when a condition $E_1 = E_2$ is satisfied. Under the balanced condition, following equation 3 holds:

$$R = (I_2/I_1)R_2 - R_1 \quad 3$$

By substituting equation 3 in Equations 1 and 2 Equation 4 can be derived out.

$$R = \frac{I_2(0) \sin^2(KC) e^{-\epsilon_2 l c}}{I_1(0) e^{-\epsilon_1 l c}} R_2 - R_1 \quad 4$$

Where the optical system is adjusted to satisfy a condition $\epsilon_1 = \epsilon_2$, Equation 4 becomes as follows $$R = \frac{I_2(0)}{I_1(0)} \sin^2(KC) R_2 - R_1 \quad 5$$

Equation 5 shows that the value $R$ of the sliding resistor $R_s$ precisely represents the concentration $C$ without being adversely affected by the turbidity or color of the liquid to be measured. Accordingly, it is possible to accurately measure the concentration of pulp or sugar in the liquid to be measured by indicating or recording the value of the sliding resistor $R_s$, or the displacement of its sliding arm or the number of revolution of the servomotor. The resistor $R_1$ is used for the zero adjustment for eliminating the effect of the stray light $I_2(0)$, whereas resistor $R_2$ for the span adjustment.

Figure 6A:
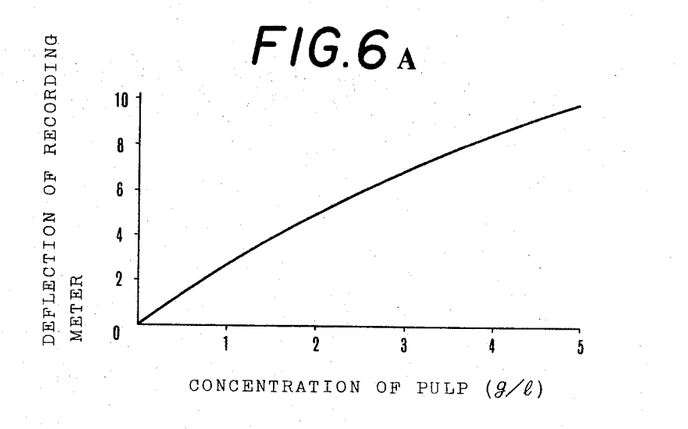
Figure 6B:
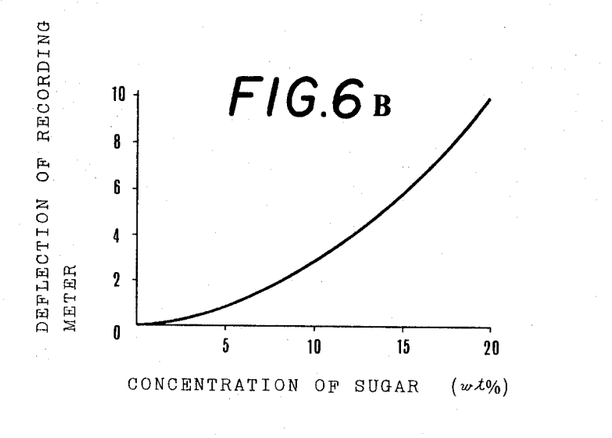

FIG. 6 shows one example of an experiment, in which FIG. 6A shows the result of measurement of the concentration of pulp in which case the relationship between concentration $C$ and the deflection of a recording meter does not satisfy Equation 5 because of the effect of the scattered light caused by the pulp. In this case, the width of the sample cell was 2 mm. FIG. 6B shows the result of measurement of the concentration of sugar in which case the relationship between concentration $C$ and the deflection of the recording meter satisfies Equation 5 because of the absence of the effect of the scattered light. In this case, the width of the cell was 150 mm.

Figure 7:
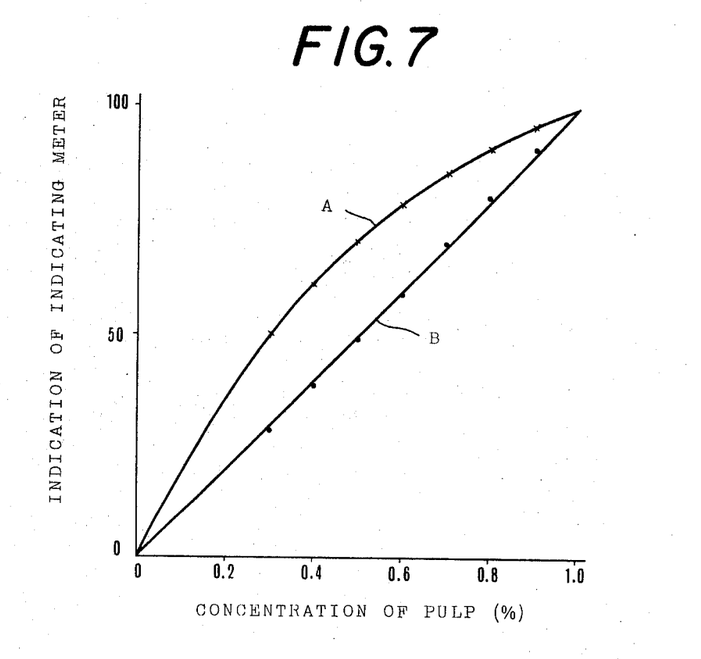

The scattered light eliminator 7 operates as follows. As shown in FIG. 3, since the eliminator 7 comprises a plurality of cylindrical light shielding members 71, transmission of the light crossing the light shilding members 71 at right angles is perfectly intercepted. When the light transmitted through the sample cell 6 and containing the diffused light component is detected by the photoelectric detector and when its output is detected by an indicating meter, its indication will be be non-linear with regard to the concentration as shown by curve A in FIG. 7, whereas the light transmitted through the scattered light eliminator 7 is comprised by parallel light beams alone transmitted through cylindrical light shielding members 71 from which scattered light has been removed, so that an output having a linear characteristic precisely proportional to the concentration can be obtained as shown by curve B in FIG. 7. The cross-sectional configuration of the light shielding members 71 is not limited to circular but may be rectangular or of other suitable configuration. Instead of providing the diffused light eliminator 7, the effect of the diffused light can also be eliminated by positioning the photoelectric detector 10 remote from the sample cell or by varying the spacing between photoelectric detectors 9 and 10.

Figure 8:
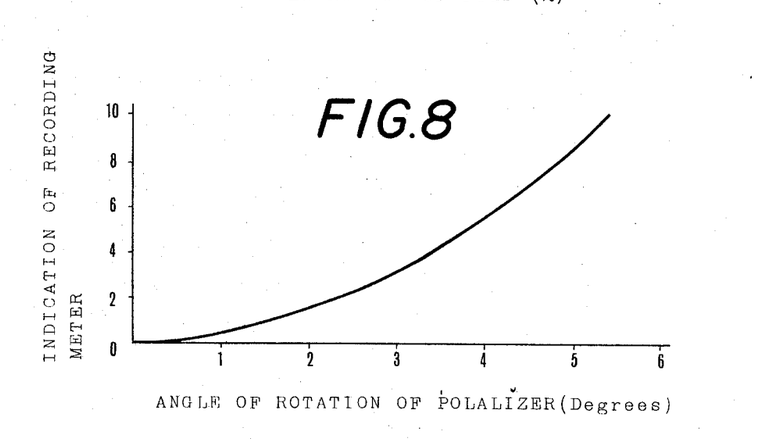

In order to always perform correct measurement it is of course necessary to calibrate the measuring apparatus before its use. In the prior art measuring apparatus, it is necessary to prepare a standard liquid of a prescribed concentration, to pour the standard liquid into the sample cell, and to adjust the apparatus until it indicates said prescribed concentration, Thus, it is very troublesome because it is necessary to prepare the standard liquid whenever the calibration is to be made. On the contrary, according to this invention, such calibration can be readily performed by varying the angle of rotation of the polarizer 4 without utilizing the standard liquid. More particularly, when the polarizer 4 is rotated by knob 41, the indication of the recording meter (the value of the sliding resistor $R_s$) varies with the angle of rotation as shown in FIG. 8. For this reason, by graduating scale 42 in terms of the angle of rotation of the polarizer 4, the apparatus can be readily calibrated by rotating the polarizer 4 to the desired angle. Such calibration can also be made by varying the angle of analyzer 8.

Figure 9:
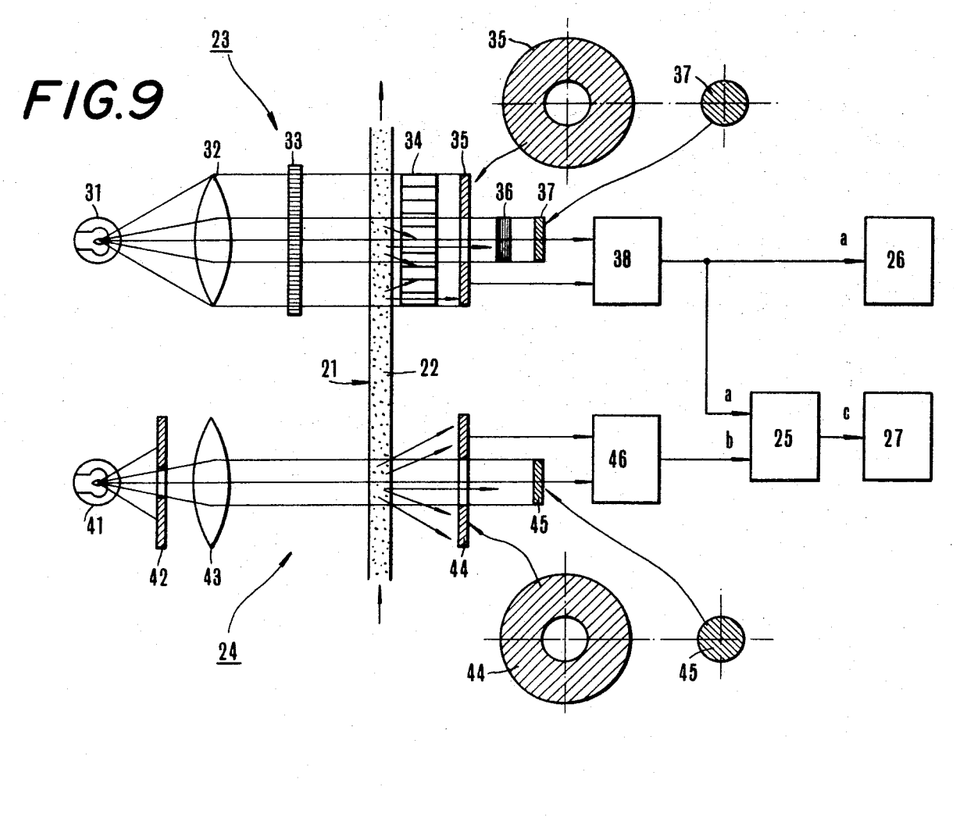
FIG. 9 is a diagrammatic representation of a modified embodiment of this invention.

FIG. 9 diagrammatically illustrates a modified embodiment of this invention suitable for independently measuring the concentrations of the pulp and clay contained in the stock inlet or whitewater in the paper making process. The pulp in the stock inlet in a conventional paper making process generally contains about 0 to 40 percent of clay and the whitewater also contains pulp and clay. It is thus essential to independently determine the concentrations of both pulp and clay. However, prior art apparatus can not independently measure the concentrations of pulp and clay. This embodiment comprises a combination of the measuring apparatus shown in FIG. 1 which utilizes the optical activity of pulp and a concentration measuring apparatus of the transmission and scattering type utilizing the scattering of the light caused by the particles of the pulp and clay. More pariculary, the modified embodiment shown in FIG. 9 comprises a sample cell 21 through which is passed a solution 22 such as a stock inlet or whitewater containing pulp and clay, and a polarized light type concentration meter 23 having the same construction as that shown in FIG. 1. Thus, the concentration meter 23 comprises a source of light 31, a lens 32, a polarizer 33, a scattered light eliminator 34 including a plurality of cylindrical or honey comb shaped light shielding members, an annular photoelectric detector 35, an analyzer 36, a circular disc shaped photoelectric detector 37 and an operational circuit 38 connected to receive the outputs from photoelectric detectors 35 and 37. The light from source 31 is adjusted by lens 32 to illuminate the entire surfaces of photoelectric detectors 35 and 37.

There is also provided a transmission and scattering type concentration meter 24 comprising a source of light 41, a light shielding plate 42, a lens 43, an annular photoelectric detector 44, a circular disc type photoelectric detector 45 and an operational circuit 46 connected to receive the outputs from the photoelectric detectors 44 and 45. The light from the source 41 is adjusted by the light shielding plate 42 and lens 43 to illuminate only the photoelectric detector 45. An operational circuit 25 is connected to receive the output $a$ of the polarized light type concentration meter and the output $b$ of the transmission and scattering type concentration meter. There are also provided an indicating recording meter 26 for indicating and recording the output $a$ of the polarized light type concentration meter 3 and an indicating and recording meter 27 for indicating and recording the output $c$ from the operating circuit 25.

The operation of the modified embodiment shown in FIG. 9 is as follows: With reference first to the operation of the polarized light type concentration meter 23, the light from the source 31 is converted into parallel beams by the action of lens 32 and is then linearly polarized by polarizer 33. The polarized light transmits through the solution 22 flowing through sample cell 21. When transmitting through the cell 21, the light is rotated from its polarized plane by the optical activity of the pulp contained in the solution. The scattered light component is removed from the light transmitted through solution 2 by the action of the scattered light eliminator 34 and a portion of the transmitted light free from the optical activity is projected upon photoelectric detector 35 whereas the remaining portion having the optical activity related to the concentration of the pulp in the solution is received by the photoelectric detector 37. The outputs from the photoelectric detectors 35 and 37 are directly proportional to their quantities of the received light and their outputs are applied to operational circuit 38 to obtain the ratio between them. Accordingly, the operational circuit 38 produces the output $a$ directly proportional to the concentration of the pulp contained in solution 22.

Figure 10:
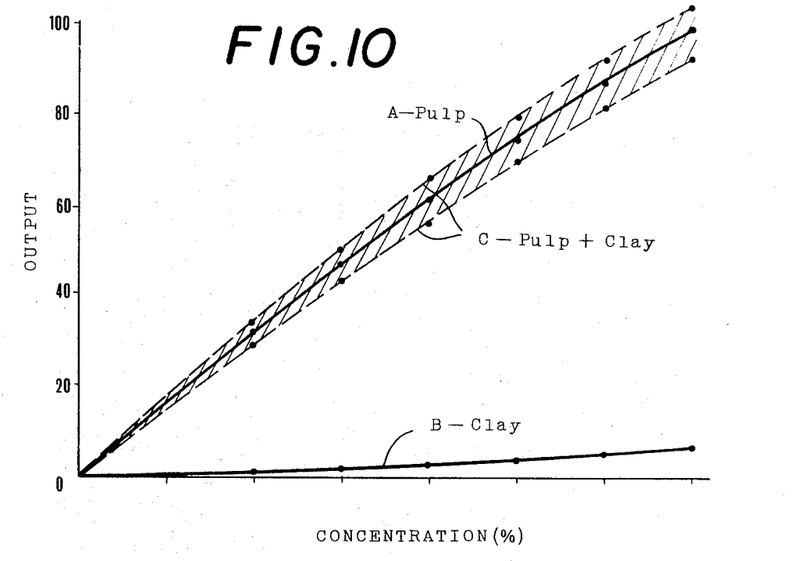
FIGS. 10 and 11 show characteristic curves to explain the operation of the embodiment shown in FIG. 9.

This relationship will be discussed in more detail by the aid of FIG. 10. Where a solution containing pulp alone is measured by the polarized light type concentration meter 23, curve A will be resulted, whereas when the solution contains only the clay, curve B will result. As can be noted from these curves, the sensitivity for the clay is lower than for the pulp. This is because pulp is optically active whereas clay is not active. This sensitivity for clay is caused by the light scattered by the clay and such sensitivity can be adjusted by varying the position of the photoelectric detector 37 to the left or right as viewed in FIG. 9 to vary the angle of incidence of the scattered light. Thus, it is possible to adjust the output of the solution 22 containing both pulp and clay as measured by the polarized light type concentration meter 23 to be within a shaded range C shown in FIG. 10, in which curve A for pulp is included. Thus, with the polarized light type concentration meter 23 it is possible to measure the concentration of only the pulp of the solution containing both pulp and clay. The output $a$ from the polarized light type concentration meter 23 is indicated and recorded by indicating recorder 26 and is also applied to operational circuit 25.

Turning now to the transmission and scattering type concentration meter 24, the light from light source 41 is converted into parallel light beams by lens 43 and the parallel light is then transmitted through the solution 22 flowing through the sample cell 21 where the light is scattered by the particles of the pulp and clay. A portion of the light which has been scattered in proporation to the concentration is received by the photoelectric detector 44 while the remaining portion of the transmitted light that is independent of the scattering caused by particles in the solution is received by the photoelectric detector 45. The outputs of these two detectors are also directly proportional to the light quantities received and their ratio is determined by operational circuit 46 which produces output $b$ corresponding to the concentration of the sum of pulp and clay in the solution.

Figure 11:
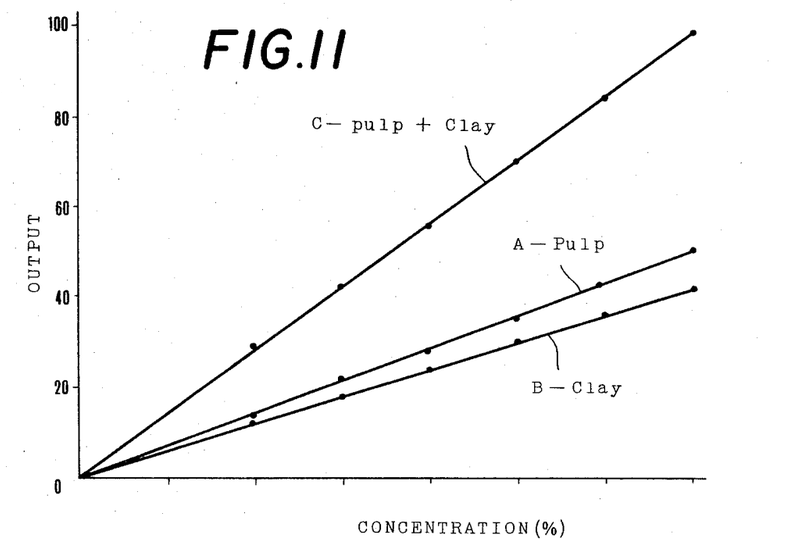

This relationship will be discussed further with reference to FIG. 11. When a solution containing the pulp alone is measured by the transmission and scattering type concentration meter 24, curve A, FIG. 11 will be resulted, whereas in the case of a solution containing the clay alone curve B will be obtained. Since the transmission and scattering type concentration meter 24 utilizes the scattering of light caused by the particles of pulp and clay the sensitivities for pulp and clay are nearly equal as shown in FIG. 11. Accordingly, where the solution contains both pulp and clay, the transmission and scattering type concentration meter 24 will have an output versus concentration characteristic as shown by curve C, in FIG. 11. When the difference between the output $a$ of the polarized light type concentration meter 23 and the output $b$ of the transmission and scattering type concentration meter 24 is processed by operational circuit 25 it will produce an output $c$ proportional to the concentration of clay alone, which is indicated and recorded by indicating recorder 27. Thus, the concentration of the clay in a solution containing both clay and pulp can be indepently measured.

Although in this embodiment an annular type and circular disc type photoelectric detectors have been shown the invention is not limited to these particular type photoelectric detectors. Any detector which measures the concentration of the sample by utilizing the optical activity thereof can be used for the polarized light type concentration meter and any detector which measures the concentration of the sample by utilizing the scattering of light by the particles of the sample can be used for the transmission and scattering type concentration meter.

Thus, this modified embodiment can independently measure the concentrations of the clay and pulp contained in the stock inlet or whitewater in the paper making process. Such independent measurement has been impossible with prior art measuring apparatus.

While the invention has been shown and described in terms of particular embodiments thereof it will be clear that many changes and modifications may be made without departing from the true spirit and scope of the invention as defined in the appended claims.

What is claimed is:

1. Concentration measuring apparatus comprising an orthogonal Nicol system including a polarizer and an analyzer, a sample cell disposed between said polarizer and said analyzer and adapted to have a liquid solution containing an optically active substance whose concentration is to be measured flow therethrough, a first photoelectric detector disposed to receive light which has passed through the polarizer, the solution and said analyzer for producing an electrical output representative thereof, a second photoelectric detector disposed to receive light transmitted only through the polarizer and said solution for producing an electrical output representative thereof, and means for determining the ratio of the outputs of said first and second photoelectric detectors, said sample cell comprising a pair of transparent plates which are disposed in parallel with spacers interposed therebetween, at least one of said plates being provided with grooves on its inner surface extending in the direction of flow of said liquid, and masks on the outside of said plates for intercepting light from said polarizer directed toward said grooves.

2. The concentration measuring apparatus according to claim 1 wherein said first photoelectric detector is in the form of a circular disc and said second photoelectric detector is in the form of a circular annulus.

3. The concentration measuring apparatus according to claim 1 wherein a scattered light eliminator is disposed behind said sample cell, and said scattered light eliminator comprises a plurality of parallel cylindrical light shielding members.

4. The concentration measuring apparatus according to claim 1 wherein said polarizer is disposed rotatably and said apparatus is calibrated in response to the rotational position of said polarizer.

5. Concentration measuring apparatus for independently measuring the concentrations of pulp and clay contained in a solution, said concentration measuring apparatus comprising: a polarized light type concentration meter including an orthogonal Nicol system comprised by a polarizer and an analyzer, a sample cell disposed between said polarizer and said analyzer and adapted to contain said solution, a first photoelectric detector disposed to receive light which has passed through the polarizer, the solution and said analyzer for producing an electrical output representative thereof, a second photoelectric detector disposed to receive light transmitted only through the polarizer and said solution for producing an electrical output representative thereof, and first means for determining the ratio of the outputs of said first and second photoelectric detectors for determining the concentration of said pulp in said solution; a transmission and scattering concentration meter including a lens for directing parallel light through said solution in said sample cell, a third photoelectric detector disposed to receive said light transmitted by said pulp and said clay for producing an electrical output representative thereof, a fourth photoelectric detector disposed to receive light scattered by said pulp and said clay for producing an electrical output representative thereof, and second means responsive to the outputs of said third and fourth photoelectric detectors to provide an output corresponding to the concentrations of said pulp and clay; and means responsive to the outputs of said first and second means for determining the concentration of said clay.

6. The concentration measuring apparatus according to claim 2 wherein said first and second photoelectric detectors are spaced apart and disposed movably so that the spacing between said detectors may be varied.

7. The concentration measuring apparatus according to claim 1 wherein said analyzer is disposed rotatably and said apparatus is calibrated in response to the rotational position of said analyzer.

* * * * *